US011878575B2

(12) United States Patent
Flanigan et al.

(10) Patent No.: US 11,878,575 B2
(45) Date of Patent: Jan. 23, 2024

(54) VEHICLE WINDOW TINTING

(71) Applicant: Ford Global Technologies, LLC, Dearborn, MI (US)

(72) Inventors: Cynthia Mowery Flanigan, Canton, MI (US); Victoria Leigh Schein, Dearborn, MI (US); Clay Wesley Maranville, Ypsilanti, MI (US); Rick H. Wykoff, II, Commerce Township, MI (US); Kenneth Edward Nietering, Dearborn, MI (US); John Michael Galan Ferrer, Carson, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 835 days.

(21) Appl. No.: 16/499,246

(22) PCT Filed: Mar. 31, 2017

(86) PCT No.: PCT/US2017/025308
§ 371 (c)(1),
(2) Date: Sep. 28, 2019

(87) PCT Pub. No.: WO2018/182676
PCT Pub. Date: Oct. 4, 2018

(65) Prior Publication Data
US 2020/0108700 A1 Apr. 9, 2020

(51) Int. Cl.
*B60J 3/04* (2006.01)
*G02F 1/01* (2006.01)
*G05B 19/042* (2006.01)
*E06B 9/24* (2006.01)

(52) U.S. Cl.
CPC .............. *B60J 3/04* (2013.01); *G02F 1/0121* (2013.01); *G05B 19/0423* (2013.01); *E06B 2009/2464* (2013.01); *G05B 2219/2628* (2013.01)

(58) Field of Classification Search
CPC ............................ B60J 3/04; E06B 2009/2464
See application file for complete search history.

(56) References Cited

U.S. PATENT DOCUMENTS 8,044,784 B2 10/2011 Ghannam et al.
8,140,219 B2 3/2012 Cernasov
(Continued)

FOREIGN PATENT DOCUMENTS

| CN | 102673350 A | 9/2012 |
| DE | 10057795 A1 | 5/2002 |
| WO | 2015045692 A1 | 4/2015 |

OTHER PUBLICATIONS

First Chinese Office Action as issued by the Chinese Intellectual Property Office dated Apr. 6, 2021 (in Chinese and English).
(Continued)

*Primary Examiner* — Jessica M Merlin
(74) *Attorney, Agent, or Firm* — Brandon Hicks; Bejin Bieneman PLC

(57) ABSTRACT

A computing device in a vehicle can determine an occupant type, location and orientation and determine intensity and direction of sunlight. The computing device can tint one or more portions of vehicle windows based on the occupant type, location and orientation and the strength and direction of sunlight.

20 Claims, 11 Drawing Sheets

(56) References Cited

U.S. PATENT DOCUMENTS

| | | |
|---|---|---|
| 8,482,834 B2 | 7/2013 | Cordova |
| 8,589,034 B2 | 11/2013 | Kwok |
| 2005/0231336 A1* | 10/2005 | Strohband ......... B32B 17/10532 |
| | | 340/426.27 |
| 2008/0094529 A1* | 4/2008 | He ..................... G02F 1/13306 |
| | | 349/16 |
| 2008/0281493 A1* | 11/2008 | Winkler ................ G06V 40/10 |
| | | 701/45 |
| 2009/0207471 A1 | 8/2009 | Blette |
| 2009/0243325 A1* | 10/2009 | Villeminey ............ B60N 2/305 |
| | | 296/65.09 |
| 2010/0026035 A1* | 2/2010 | Kikuchi .................... B60J 3/04 |
| | | 296/97.7 |
| 2011/0163866 A1* | 7/2011 | Ghannam ................ B60J 3/04 |
| | | 340/449 |
| 2013/0009059 A1* | 1/2013 | Caruso ................... G02C 7/101 |
| | | 351/44 |
| 2014/0236323 A1 | 8/2014 | Brown et al. |
| 2016/0101710 A1* | 4/2016 | Bonk .................. B60N 2/0248 |
| | | 297/217.2 |

OTHER PUBLICATIONS

Notification of Transmittal of International Search Report and Written Opinion of International Search Authority dated Jun. 27, 2017 regarding International Application No. PCT/US2017/025308 (16 pages).

* cited by examiner

VEHICLE WINDOW TINTING

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. A computing device can also be equipped with computing devices, networks, sensors and controllers to acquire information regarding the vehicle's occupants and to pilot the vehicle based on the information. Vehicles in autonomous mode can provide occupants with the ability to move seating around to socialize, recline seats to sleep or view video screens, free from the need to watch the roadway.

DETAILED DESCRIPTION

Figure 1:
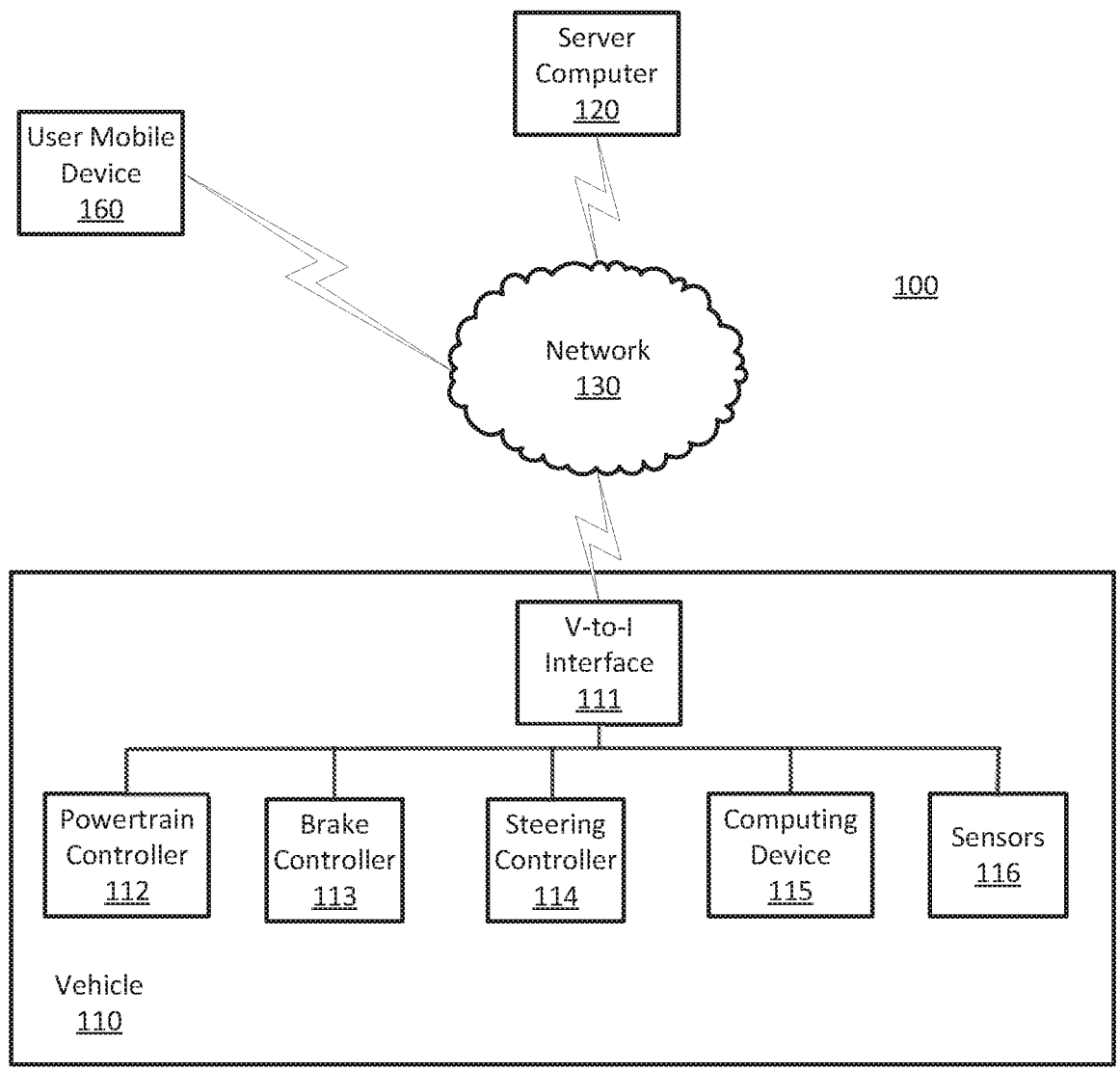
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real, i.e., physical, world including features such as roads. Vehicles can be piloted and maps can be determined based on locating and identifying road signs in the surrounding real world. By piloting we mean directing the movements of a vehicle so as to move the vehicle along a roadway or other portion of a path.

Disclosed herein is method, comprising determining an occupant type, location and orientation with respect to sunlight, determining an intensity and a direction of sunlight; and changing the tint of one or more portions of vehicle windows based on the occupant type, location and orientation and the intensity and direction of sunlight. The occupant type can include adult, child and infant and the location can include a location of a vehicle seat, wherein the location of the vehicle seat includes front, back and third row and the orientation can include reclined and reversed.

The intensity of sunlight can include solar irradiance in watts/cm$^2$ and the direction of sunlight can include diffuse. Changing the tint of one or more portions of vehicle windows can include changing the tint of one or more portions of a single window, and changing the tint of one or more portions of vehicle windows can be based on occupant types, locations and orientations of two or more occupants, wherein one of the two or more occupants is operating the vehicle.

Changing the tint of one or more portions of vehicle windows can be defined as changing the percent transmission of sunlight through the portion of the vehicle windows and changing the tint of one or more portions of vehicle windows based on the occupant type, location and orientation and the intensity and direction of sunlight includes changing while a vehicle is traveling, thereby tracking the direction of sunlight with respect to the vehicle.

Determining an intensity and a direction of sunlight can include determining thermal load associated with the sunlight, wherein thermal load can be defined as an increase in temperature in the interior of a vehicle caused by irradiance from sunlight.

Further disclosed is a computer readable medium storing program instructions for executing some or all of the above method steps. Further disclosed is a computer programmed for executing some or all of the above method steps, including a computer apparatus, programmed to determine an occupant type, location and orientation; determine intensity and direction of sunlight; and change the tint of one or more portions of vehicle windows based on the occupant type, location and orientation and the intensity and direction of sunlight.

The occupant type can include adult, child and infant, and the location can include a location of a vehicle seat. The location of the vehicle seat can include left, right, middle, front, back and third row, and the orientation can include reclined and reversed. The intensity of sunlight can include solar irradiance in watts/cm$^2$ and the direction of sunlight can include diffuse. Changing the tint of one or more portions of vehicle windows can include changing the tint of one or more portions of a single window. Changing the tint of one or more portions of vehicle windows can be based on occupant types, locations and orientations of two or more occupants, and one of the two or more occupants is operating the vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing device, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
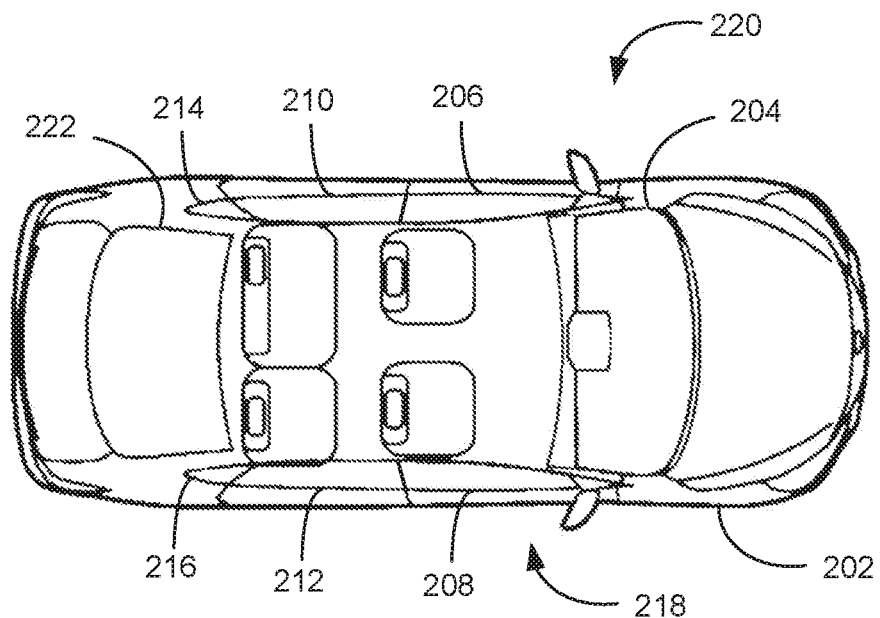
FIG. 2 is a diagram of an example vehicle.

FIG. 2 is a diagram of an X-ray view of a vehicle 202, showing windshield 204, rear window 222, left and right, front and rear door windows 206, 208, 210, 212, respectively, and left and right rear quarter windows 214, 216 and the interior 218 of vehicle 202. Collectively, windshield 204, rear window 222, left and right, front and rear door windows 206, 208, 210, 212 and left and right rear quarter windows 214, 216 and any other glazed portions of vehicle 202 including sun roofs and moon roofs etc., are referred to as the "greenhouse" 220 of vehicle 202. The greenhouse 220 can include active glazing that changes the tint of regions of the greenhouse 220 based on location and position of occupants and the location and strength of sunlight.

Vehicle 202 includes active shades or active glazing to protect and shade occupants of vehicle 202 from solar radiation (sunlight and glare) while optimizing temperature in the interior 218 of vehicle 202, specifically catering to cases where occupants are facing to the rear or other alternate direction to forward facing. Vehicle 202 includes the presently disclosed system that tints the greenhouse 220 to provide occupant protection from thermal loading and glare due to solar radiation. This system can determine the type, location and orientation of occupants and the intensity and direction of sunlight and determine how to direct active glazing applied to portions of the greenhouse 220 to change tint to provide occupant comfort. The system could alternatively or additionally be implemented using mechanical shades, for example, in addition to active glazing technology discussed in the examples herein.

Figure 3:
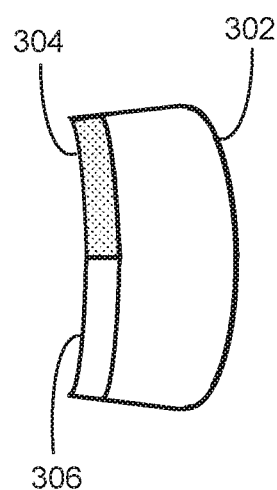
FIG. 3 is a diagram of an example vehicle windshield.

Active glazing as that term is used herein means using the computing device 115 in vehicle 202 to control the tint, or percent light transmission, through regions of the greenhouse 220, via controllers and sensors. Controlling tint can also change spectral light transmission, thereby changing the perceived color of the transmitted light. For example, FIG. 3 is a diagram of a windshield 302, having two active glazing regions 304, 306. In this case, active glazing region 304 is set "off" to tint the active glazing region 304 and thereby decrease the percent transmission of light through the active glazing region 304. Active glazing region 306 is set to "on" to permit light to be transmitted through the region without attenuation, for example.

Active glazing can be accomplished by photoelectric films applied to glass surfaces of vehicle 202 greenhouse 220 or by mechanical shades, for example. Examples give herein assume the use of photoelectric films as described below, however, mechanical shades under the control of computing device 115 can be advantageously used to accomplish active glazing.

The systems and methods described in the examples given herein can determine the presence and position of an occupant in a vehicle 202, where the position can be determined by which seat in the interior 218 of vehicle 202 is occupied. Additionally, a type of occupant can be determined. A computing device 115 in vehicle 202 can employ an infrared or visible light camera or a fingerprint scanner, for example, to identify or estimate the age of an occupant and pertinent health history using known machine vision techniques. Occupant type can be determined in terms of age, size, etc. and estimated capability to interact with vehicle 202 controls.

It is possible to provide the exact level of tint requested by an occupant based on information regarding the direction and intensity of sunlight and the location and position of the occupant. By controlling tint to those portions of the greenhouse 220 likely to be affected by sunlight, an occupant's vision can be maintained for remaining areas of the greenhouse 220. Computing device 115 can tint portions of the greenhouse 220 out of view of an occupant but which contribute to uncomfortable thermal loading. Autonomously piloted vehicles 202 permit many different configurations of positions for occupants since a clear view of a roadway is not required, and for the same reason, the greenhouse 220 can be tinted in fashions not possible for occupant-piloted vehicles 202.

Computing device 115 can input requests from occupants for greenhouse 220 tint via human/machine interfaces including dashboard controls such as switches or knobs, voice-activated controls, gesture-activated controls or smart phone apps, etc. For example, an occupant can wish to read and request to have tint levels set to permit reading with ambient light. As the vehicle 202 travels and the direction and intensity of the sun changes, computing device 115 can change the greenhouse 220 tint to maintain the same average light intensity in the interior of vehicle 218 as was requested originally by the occupant. In cases where multiple occupants request differing levels of greenhouse 220 tint, the computing device can determine the location and orientation of each occupant and tint the portion of the greenhouse 220 located near each occupant according to their preference, for example.

Figure 4:
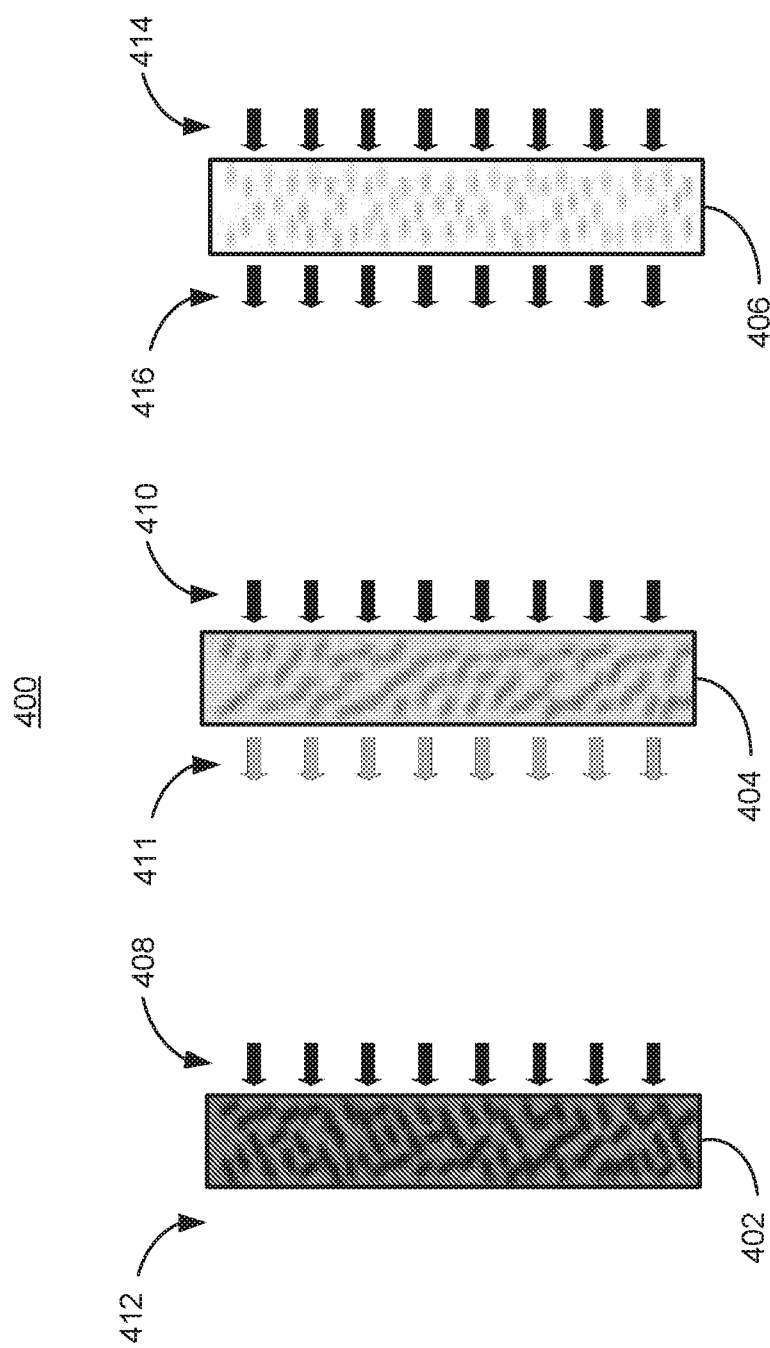
FIG. 4 is a diagram of an example of active glazing.

FIG. 4 is a diagram of suspended particle device (SPD) active glazing 400. Active glazing 400 includes three SPDs 402, 404, 406. SPDs 402, 404, 406 are formed as microscopic light-absorbing particles dispersed in droplets within a film. In the "off" state, no voltage is applied across the film, thereby causing the suspended, light-absorbing, rod-like particles to be distributed at random throughout the film, thereby absorbing light and making the film dark. This is shown by SPD 402, where incoming light 408 is substantially blocked 412 by SPD 402 in the "off" state. When moderate voltage is applied to the surfaces of SPD 404, the resulting electric field causes the light-absorbing, rod-like particles to begin to align and permit incoming light 410 to be partially transmitted 411 by SPD 404 in a partially "on" state. When full voltage is applied across the surfaces of SPD 406, the resulting electrical field causes the light-absorbing particles suspended in SPD 406 become fully aligned, and incoming light 414 is maximally transmitted 416 by SPD 406 in the full "on" state.

SPD active glazing has the advantages of being easily applied to automotive greenhouse glass and being able to adjust from a dark tint to transparent or little tint, according to applied voltage, and being able to change relatively quickly from one tint to another. For example, as a vehicle 202 turns a corner, sunlight may suddenly impinge upon windshield 302 and thence the interior 218 of vehicle 202. SPD-based active glazing region 304 can be switched from "on", or transparent, to "off", or dark tint, to provide shade for an occupant of vehicle 202 moderately quickly (<~3 second). SPD technology can be applied as active glazing to roof glazing such as moon roofs, etc., where opacity is desired.

Disadvantages to SPD active glazing include cost, and the fact that most vehicles cannot have any glazing with less than 70% transmission over the visible spectrum in a windshield unless it is in a shade band or in the roof glass, in accordance with the Federal Motor Vehicle Safety Standard 205 (ANSI/SAE Z26.1-1996, Society of Automotive Engineers, Inc., Warrendale, PA 15096). The greenhouse 220 can be divided into a "vision band" requiring near transparent tints, and one or more "shade bands", where active glazing technology can provide tints up to and including opaque, for example. Sport utility vehicles (SUVs), crossover utility vehicles, (CUVs), and trucks must have 70% or greater transmission in the visible spectrum in the vision band in front of the b-pillar, but behind the b-pillar, glazing can be opaque. The b-pillar is a line separating the front door window glazing from glazing in windows to the rear including rear door windows and rear quarter windows and rear window glass. Window tint for a vehicle 202 in autonomous mode as discussed above in relation to FIG. 1 may be regulated differently than occupant piloted at some point in the future, meaning any part or all, of the greenhouse can be tinted any shade from transparent to opaque while in operation.

Figure 5:
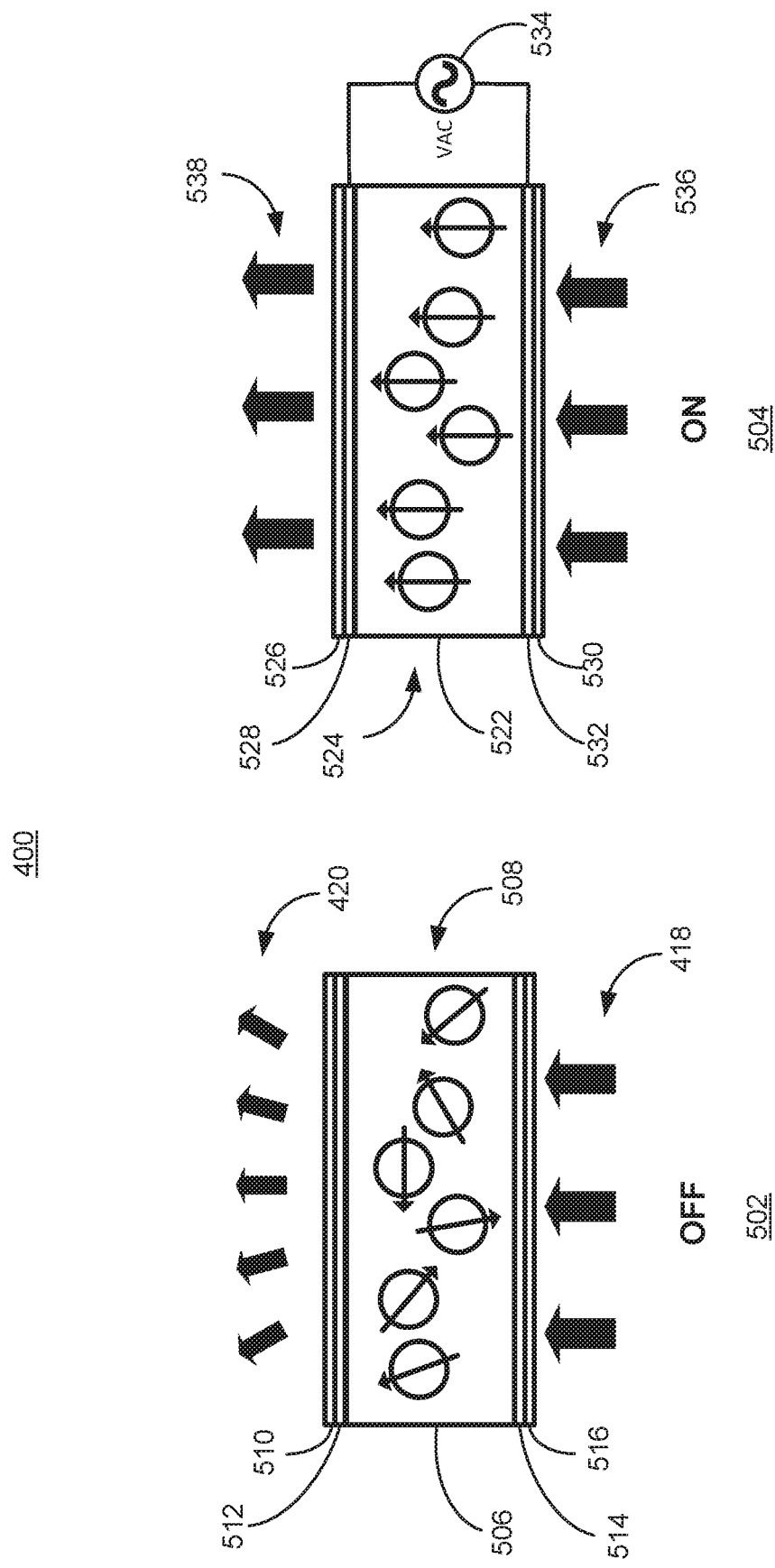
FIG. 5 is a diagram of a further example of active glazing.

FIG. 5 shows polymer-dispersed liquid crystal (PDLC) active glazing 500, including a PDLC 502 in the "off" state and a PDLC 504 in the "on" state. PDLCs 502, 504 include top and bottom glass substrates 510, 526, 516, 530, which support the PDLCs, the top and bottom indium-tin-oxide (ITO) electrodes 512, 514, 528, 532, which provide electrical contacts while remaining transparent to visible light, and a polymer 506, 522 which includes liquid crystal droplets 508, 524. In the off state, the liquid crystal droplets 508 in PDLC 502 are distributed randomly, and incoming light 518 is thereby scattered 520 upon passing through the off state PDLC 502. Scattered 520 light makes scenes viewed through off state PDLC 502 appear "cloudy" or unfocused. Applying a voltage 534 across the ITO electrodes 528, 532, creates an electrical field within PDLC 504, aligning liquid crystal droplets 524 to permit incoming light 536 to be transmitted substantially unchanged 538 by on state PDLC 504, thereby making PDLC 504 appear transparent. PDLC 502, 504 can be manufactured as a thin film and applied to glazed surface of a vehicle greenhouse to control transmission of light.

PDLC technology is similar to SPD technology discussed above in relation to FIG. 4, in that both include particles in a polymer film. SPD technology includes rod-like particles, while PDLC includes liquid crystals. The liquid crystals can orient in an electric field and transmit light, or they can randomize in the absence of a field and thereby scatter light. One difference is that while SPD particles absorb light energy and thereby darken tint by reducing transmission, PDLC scatters light, making the transmitted light cloudy but not reducing light energy as much as SPD particles. Other differences are that PDLC can cost less than half the cost of SPD, and PDLC "cloudy/clear" technology can switch between on and off states much more quickly than SPD.

Fast switching permits PDLC to be used to adapt active glazing to follow the path of a vehicle 202 as it turns and changes direction by changing from clear to cloudy and back again in response to the changing direction from which sunlight is irradiating the vehicle 202. PDLC can be applied in the shade band of an occupant-piloted vehicle 202 or possibly anywhere in the greenhouse of an autonomous vehicle 202 as discussed above. Occupant vision can be required, and hence greenhouse glazing tint reduced, to increase occupant vision to reduce motion sickness while vehicle 202 is moving, permit emergency vehicles access in emergencies, and at vehicle 202 stops.

Figure 6:
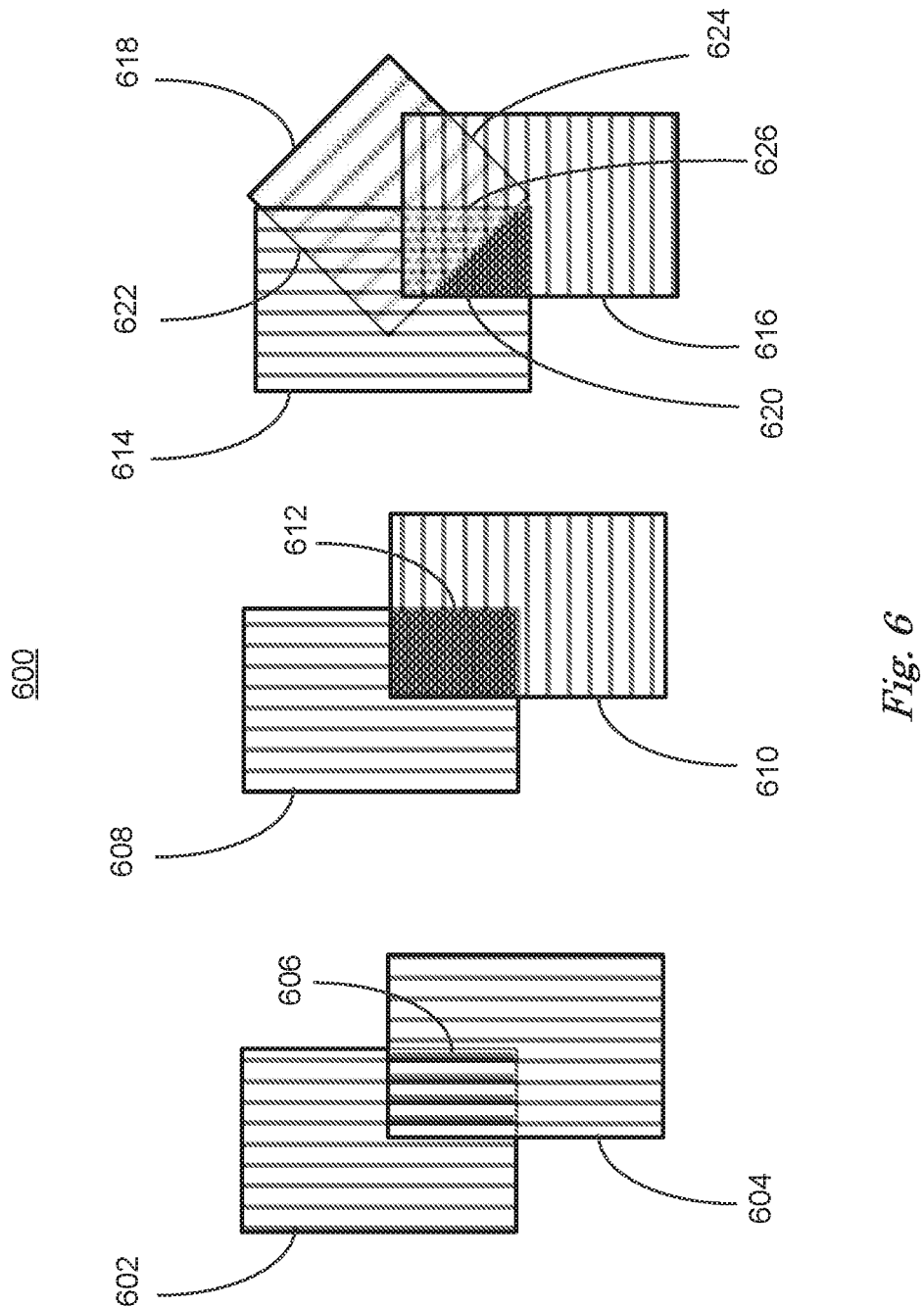
FIG. 6 is a diagram of a further example of active glazing.

FIG. 6 shows polarizing filters 600, which can be produced as films and applied to vehicle 202 glazing to reduce glare. Polarizing filters 600 transmit light when the polarizing axis is aligned in a particular direction and filter out light having the polarizing axis perpendicular to that direction. Polarizing filters include filters 602, 604, both aligned in the same direction. Overlapping area 606 shows that the resulting tint from two polarizing filters 602, 604 is high transmission in the direction of the polarizing axes of polarizing filters 602, 604. Polarizing filters 608, 610 are aligned perpendicular to each other and the resulting overlapping area 612 is opaque, since each polarizing filter 608, 610 blocks light with the polarizing axes in perpendicular directions.

Polarizing filters 614, 616 are aligned perpendicular to each other, making the overlapping are 620 opaque as discussed above. Partially inserted between polarizing filters 614, 616, is polarizing filter 618. Instead of filtering light in a particular direction, polarizing filter 618 is a circular polarizer or quarter-wave filter that rotates the polarization axis 90 degrees. As can be seen, polarizing filter 618 has some additional tint effect on overlapping area 622, 624 with polarizing filters 614, 616, but in overlapping area 626 polarizing filter 618 has rotated the polarizing axis from light transmitted by polarizing filter 614 90 degrees to permit its transmission by polarizing filter 616.

Disadvantages of polarizing film technology include difficultly in implementing rotating films that take advantage of polarizing films ability to change tint with rotation between films. It is possible to convert rotating motion to linear motion to permit polarizing films to be used to create tints from transparent to opaque using linear rather than rotary motion using wave retarders.

Figure 7:
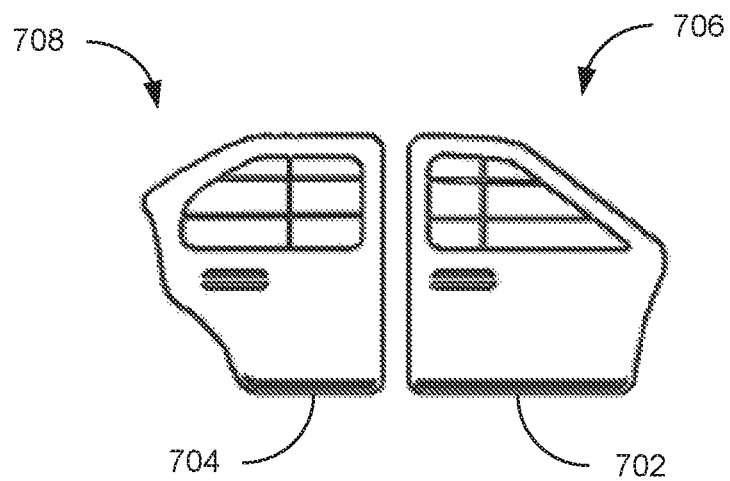
FIG. 7 is a diagram of example vehicle doors with active glazing.
Figure 8:
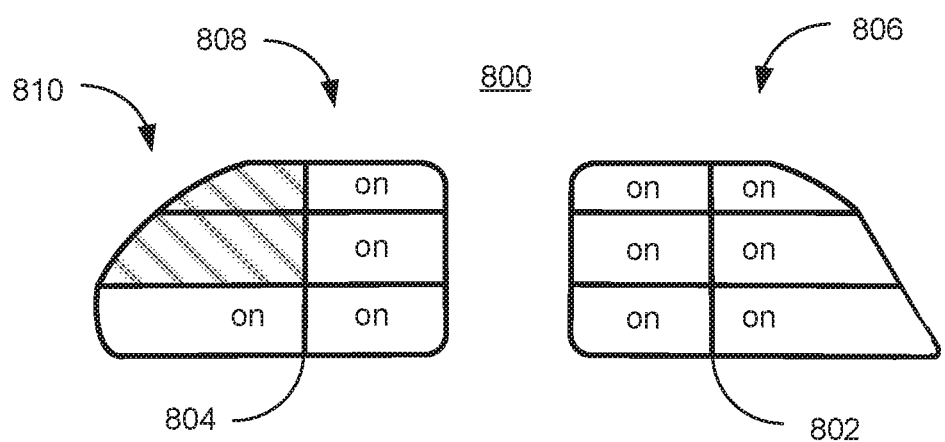
FIG. 8 is a diagram of example vehicle windows with active glazing.

FIG. 7 shows SPD applied to front and rear side windows 706, 708 of front and rear doors 702, 704 of vehicle 202. Each side window 706, 708 has SPD-based active glazing applied in a pattern with two columns of three rows, where each element of the pattern can be controlled independently. FIG. 8 is a diagram of vehicle parts 800 including active glazing elements 806, 808 of front and rear side windows 802, 804. FIG. 8 shows all six active glazing elements 806 of front side window 802 in an on, or full transmission state, while only four of the active glazing elements 808 of rear side window 804 are in an on state, two of the active glazing elements 808 are in an off, or tinted, state, thereby providing shade to the interior 218 of vehicle 202.

PDLC can be applied as active glazing to windows included in vehicle 202 greenhouse 220. PDLC active glazing in the on or clear state, would transmit sunlight, including sunlight strong enough to cause uncomfortable heating of an occupant of vehicle 202. PDLC active glazing in the off, or cloudy state would scatter the incoming sunlight and reduce uncomfortable heating and glare to an occupant of vehicle 202.

Figure 9:
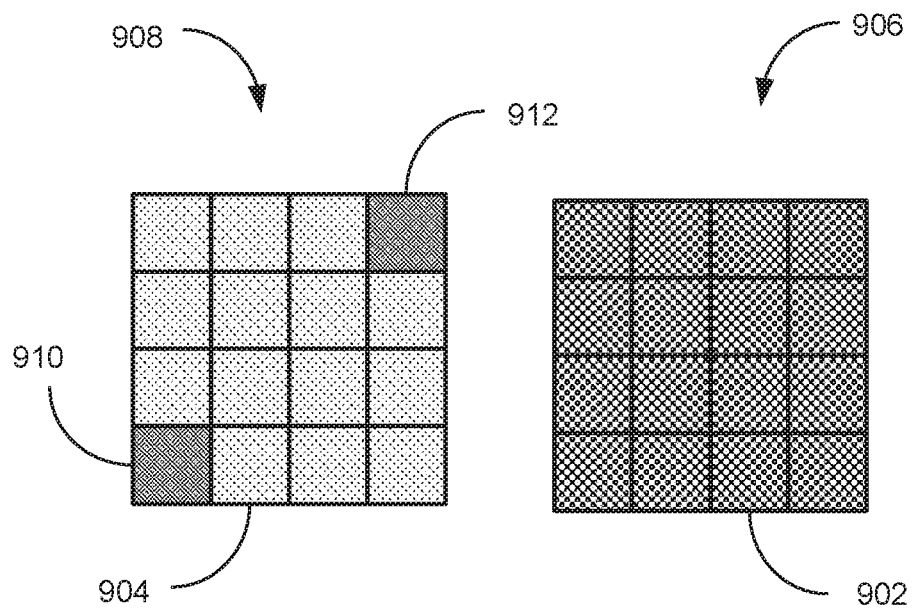
FIG. 9 is a diagram of a further example of active glazing.

FIG. 9 is a diagram of patterned active glazing applied to a windows 902, 904 portion of vehicle 202 greenhouse 220. Active glazing can be applied in a pattern of pixels 906, 908, where the tint of each pixel or rectangular area can be controlled independently. The active glazing can be SPD, PDLC or polarization-based. Window 904 shows a pattern of pixels 908 where two pixels 910, 912 have been set to an off or darkened tint state, while the remaining pixels 908 are set to on or transparent. Window 902 shows a pattern of pixels 906 where all the pixels 906 are set to off or darkened tint state for example. Windows tinted in this fashion can target a specific pixel area for setting to off. This can be advantageous for cases where only a specific area of the vehicle 202 interior 218 is desired to be shaded, such as a pet or a package, where the package can include ice cream, for example, or a rear-facing child seat. Targeting a specific pixel area on windows is most effective in reducing glare (occupant visibility discomfort) since this includes blocking glare to the occupant's eyes, which is a specific area requiring only partial tinting of a window. Reducing thermal discomfort as discussed above includes tinting larger or complete areas of windows to provide full coverage of an occupant's head, neck, face, torso, etc.

Figure 10:
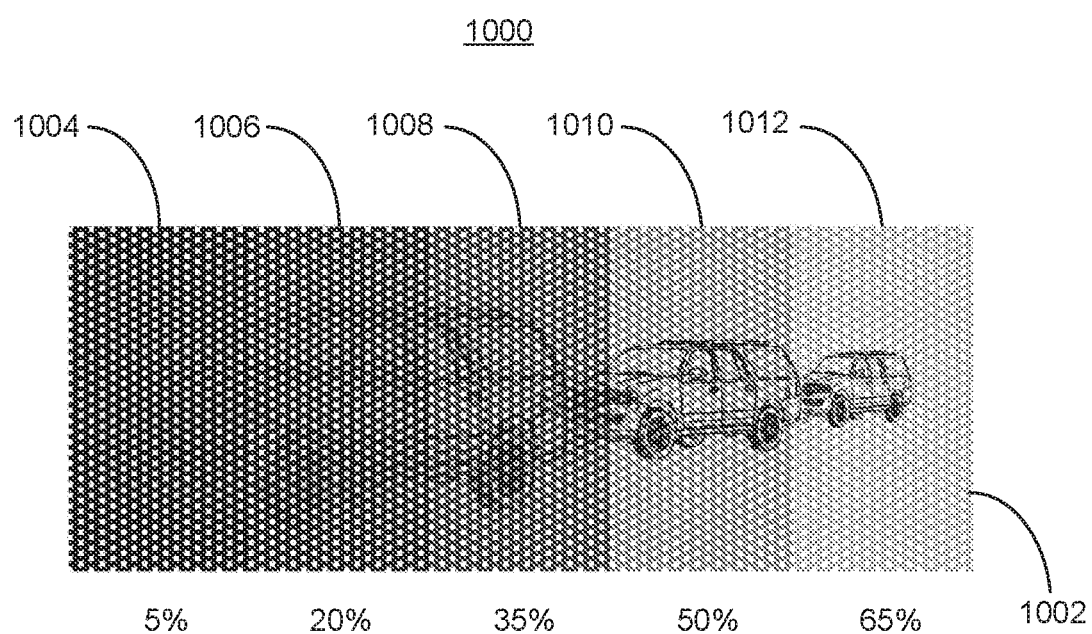
FIG. 10 is a diagram of an example shuttle vehicle with active glazing.

FIG. 10 is a diagram showing another application of active glazing applied to vehicle 202 greenhouse 220. FIG. 10 shows a traffic scene 1000 viewed through an active glazing area 1002. Active glazing area 1002 includes subareas 1004, 1006, 1008, 1010, 1012 that each exhibit a different tint from 5% transmission to 65% transmission in 15% increments. Active glazing technology can be controlled by computing device 115 to produce a desired level of tint by controlling the voltage that creates the electric field in the active glazing film, for example. Controlling the level of tint can permit computing device 115 to control greenhouse 220 tint in accordance with vision and shade bands while the vehicle 202 is occupant piloted and control tint without regard for vision bands when parked or in autonomous mode.

Figure 11:
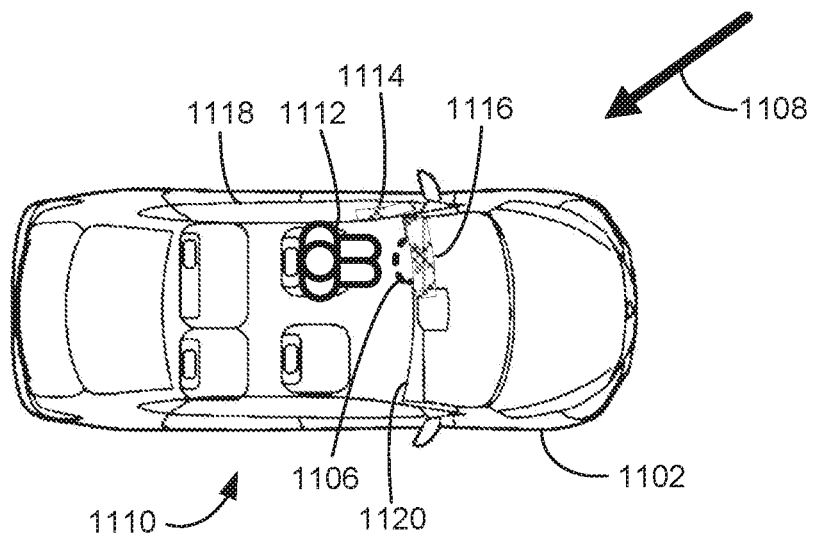
FIG. 11 is a diagram of an example vehicle with active glazing.

FIG. 11 is a diagram of a vehicle 1102 shown in a top view with the vehicle 1102 top removed to make visible features of vehicle 1102 interior 1110. Vehicle 1102 includes an occupant 1112 and may or may not include a steering wheel 1106 (dotted line), since vehicle 1102 can be autonomous or occupant piloted as discussed above in relation to FIG. 1. Vehicle 1102 can be equipped with sensors to detect the strength and direction of solar radiation 1108 impinging upon interior 1110 of vehicle 1102. Vehicle 1102 can also be equipped with sensors to detect which seats are occupied by occupants and what direction the seats are facing to determine if an occupant will be affected by glare. Computing device 115 in vehicle 1102 has determined that, based on the direction and strength of solar radiation 1108, occupant 1112 will be affected by glare and portions of active glazing 1114, 1116 on side window 1118 and windshield 1120, respectively, can be set to dark tint or off to reduce glare.

Computing device 115 can distinguish between an occupant sitting in a seat and a package being placed in a seat. If an occupant is sitting in a seat, computing device 115 can query the occupant to request tint/auto-tint, followed by predetermined options, including full-coverage, partial blockage or potential blockage based on the direction of solar radiation and the position of the occupant. This can be determined by determining the vehicle 1102 location, orientation and direction of travel and solar radiation 1108 direction as discussed above. If there is sun load detected by computing device 115 using sensors as discussed above, computing device can tint any, or all, of any window of vehicle 1102 equipped with active glazing to reduce glare or thermal loading on occupants or indicated areas of the interior 1110 of vehicle 1102 including pets or packages, for example.

Sensors that can be used include infrared (IR) sensors. IR sensors can be used to detect occupants by the IR radiation occupants emit. An IR sensor can also be used to determine occupant thermal state. For example, an occupant can be heating up for reasons unrelated to glare from solar load. This information can be received at computing device 115 from occupant feedback via an internal tactile switch or button on the climate control module or via vehicle 1102 internal communications networks from IR sensors as discussed above in relation to FIG. 1.

Figure 12:
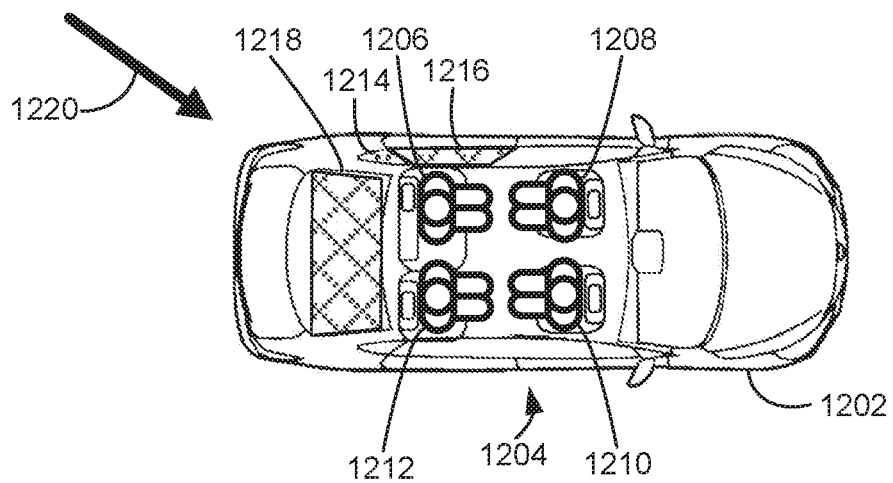
FIG. 12 is a diagram of a further example vehicle with active glazing.

FIG. 12 is a diagram showing a vehicle 1202, in X-ray view to show interior 1204. In vehicle 1202 occupants 1208, 1210 have turned their seats around to face occupants 1206, 1212, since vehicle 1202 is in autonomous mode. An occupant 1206, 1208, 1210, 1212 can reconfigure the interior 1204 of vehicle 1202 for better visibility or comfort. Computing device 115 can determine that occupants 1208, 1210 have turned their seats around and because computing device 115 has determined the direction that solar radiation 1220 is impinging vehicle, computing device 115 can direct active glazing to darken tint of windows 1214, 1216, 1218 to reduce solar glare.

Computing device 115 can determine the direction and strength of the solar radiation 1220, determine the direction and location of occupant 1206, 1208, 1210, 1212 eye gaze with respect to the vehicle 1202 based, in part, on the directional orientation of seats in vehicle 1202, and the location and position of the vehicle 1202 with respect to the solar radiation 1220 and thereby determine which active glazing elements to darken tint to reduce glare and thermal loading. A technique for determining the orientation and location of an occupant 1206, 1208, 1210, 1212 of a vehicle 1202 includes sensors attached to a seat that senses when the seat is occupied. The sensors can further determine if the seat is occupied by an occupant or a package, for example. This can be determined by sensors in the seat that detect weight, or an IR camera-based occupant detection system or by a video camera-based occupant detection system.

Sensors that detect the intensity and direction of solar radiation 1220 include video sensors and radiometers. Video sensors can be used to detect the intensity and direction of sunlight impinging on the interior of vehicle 1202 by deploying multiple video sensors arrayed to acquire a 360 degree, panoramic view of the interior of vehicle 1202 and therefrom determine the direction and intensity of solar radiation 1220. Intensity and direction of solar radiation can also be determined using a radiometer with a 360 degree view of the interior of vehicle 1202. A radiometer is a device for measuring the intensity of incident light radiation. Radiometers can integrate light energy across the visible spectrum and nearby IR and ultraviolet (UV) radiation. Radiometers can also be filtered to mimic the response of the human optical system to light energy. In this fashion the output from the radiometer can most closely match the response of the human eye and therefore accurately predict glare from solar radiation 1220.

Determination of the direction from which solar radiation 1220 is incident upon vehicle 1202 can be aided by information from location and position sensors such as GPS, accelerometer and electronic compass such as flux gate compass data. Using this information, computing device 115 can use astronomical data stored in non-volatile memory to predict where the sun should be in relation to the vehicle 1202 at the current time. IR, video and radiometric data can confirm the solar radiation 1220 direction predicted by computing device 115 from astronomical and sensor data.

Figure 13:
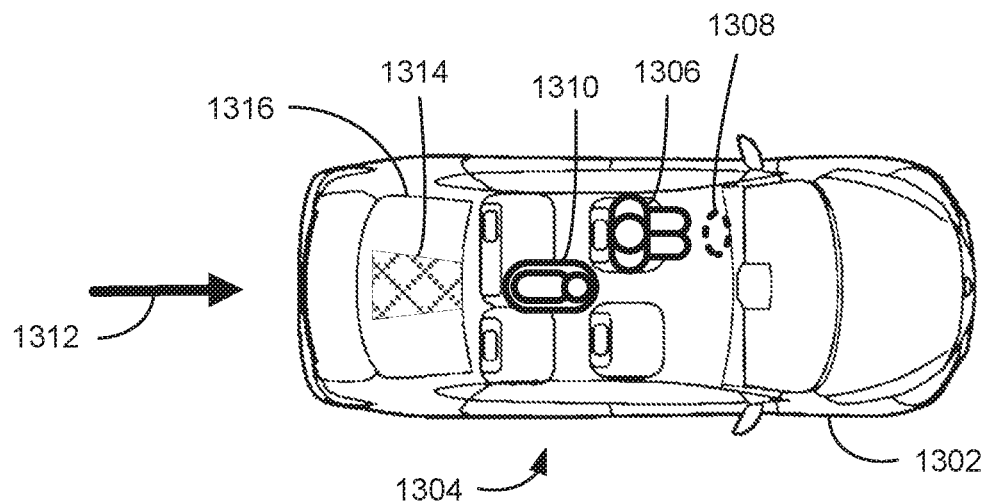
FIG. 13 is a diagram of a further example vehicle with active glazing.

FIG. 13 is a diagram showing a vehicle 1302, in X-ray view to show interior 1304. Interior 1304 of vehicle 1302 includes an occupant 1306 and optionally, a steering wheel 1308 (dotted line) if vehicle 1302 is occupant piloted. Interior 1304 of vehicle 1302 also includes an infant in a rear-facing car seat 1310. As discussed above in regard to FIGS. 11 and 12, computing device 115 in vehicle 1302 can determine a direction and strength of solar radiation 1312 impinging upon interior 1304 via sensors. Computing device 115 can also determine that a seating position associated with infant in car seat 1310 in occupied, and that the seating position is occupied by an infant in a rear-facing car seat 1310 and the infant therein is oriented in a rear-facing position via force sensors in the seats and via IR and video camera sensors. Computing device 115 can combine information from these sensors to determine that solar glare and thermal loading from solar radiation 1312 can make the infant in the rear-facing car seat 1310 uncomfortable. Computing device 115 can direct active glazing area 1314 of rear window 1316 of vehicle 1302 to darken tint, and thereby protect infant in the rear-facing car seat 1310 from uncomfortable solar radiation and glare 1312.

In this case, it is beneficial to have computing device 115 determine that the infant in the rear-facing car seat 1310 can be uncomfortable, because infants typically cannot communicate their discomfort articulately and occupant 1306 can be unaware of the solar radiation 1312 due to the direction of their gaze, for example. This can also be the case when a package or other object is detected by computing device 115. Computing device 115 can be programmed to detect a package or other object in the interior 1304 of vehicle 1302 and determine the thermal loading due to solar radiation 1312 and direct active glazing areas of the greenhouse of vehicle 1302 to darken tint to thereby protect the package from solar radiation 1312. For example, a package can be a bag of groceries including a package of ice cream. In cases where vehicle 1302 is parked, computing device 115 can direct active glazing areas of the greenhouse to darken tint to opaque to protect occupants and packages.

Figure 14:
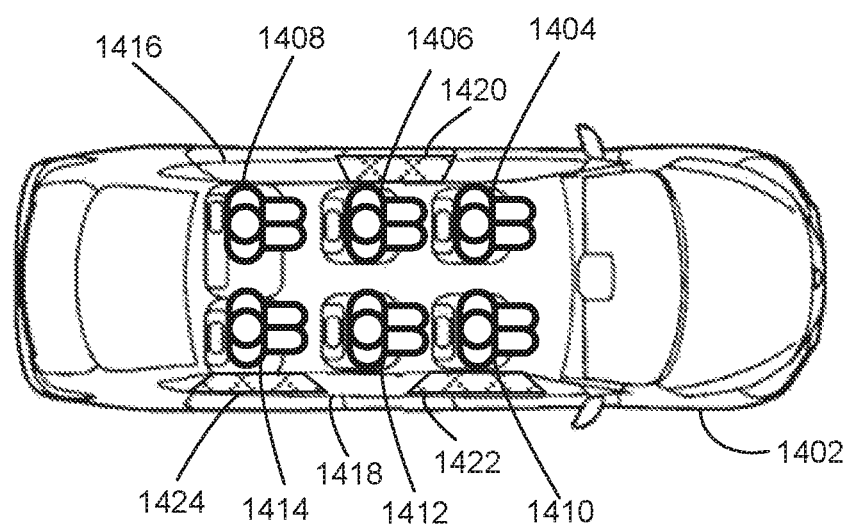
FIG. 14 is a diagram of a further example of active glazing technology.

FIG. 14 is a diagram of a shuttle bus 1402 shown in X-ray view. Shuttle bus 1402 has six occupants 1404, 1406, 1408, 1410, 1412, 1414, each seated next to a portion of a side window 1416, 1418. Side windows 1416, 1418 are each equipped with active glazing pixels as described above in relation to FIG. 9. Active glazing pixels on side windows 1416, 1418 are controlled by computing device 115 in shuttle bus to darken tint depending upon occupant 1404, 1406, 1408, 1410, 1412, 1414, request, for example. Side windows 1416, 1418 have areas 1420, 1422 and 1424 of darkened tint, darkened at the request of nearby occupants 1406, 1410, 1414, respectively. In this fashion, each shuttle occupant seated next to a window can have their preference for window tint catered to. This is similar to an airplane cabin, where each window seat can have a window shade. Active glazing technology can provide controlled tinting to privacy walls, moon and sun roofs and any portion of any window where shade or glare protection is desired. The active glazing can be under individual occupant control or under control by computing device 115 as was discussed in relation to FIGS. 13 and 14, above.

Figure 15:
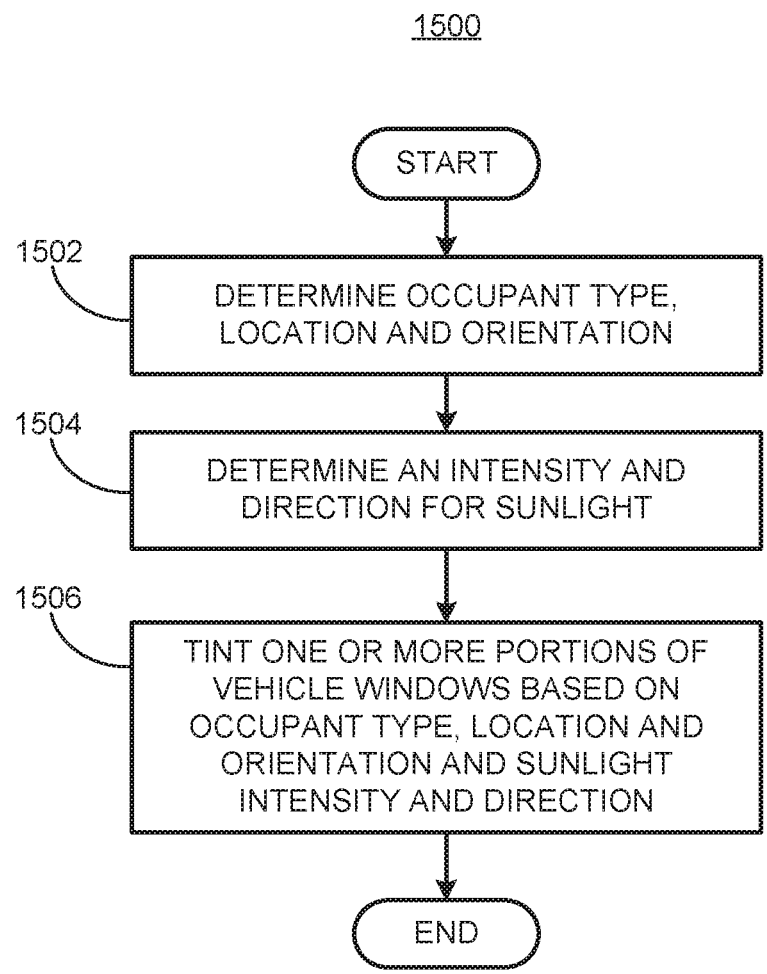
FIG. 15 flowchart diagram of an example process to tint windows.

FIG. 15 is a diagram of a flowchart, described in relation to FIGS. 1-14, of a process 1500 for tinting one or more portions of active glazing areas applied to glazed surfaces of a vehicle 202 greenhouse 220 under control of a computing device 115. Process 1500 can be implemented by a processor of computing device 115, taking as input information from sensors 116, and executing instructions and sending control signals via controllers 112, 113, 114, for example. Process 1500 includes multiple steps taken in the disclosed order. Process 1500 also includes implementations including fewer steps or can include the steps taken in different orders.

Process 1500 begins at step 1502 in which computing device 115 in vehicle 202 determines occupant type, location and orientation. Computing device 115 can determine occupant type, location and orientation from sensors included in vehicle 202. For example each seat in vehicle 202 can be equipped with sensors to detect the weight of objects on the seat to permit computing device 115 to determine occupant type by weight. Each seat can also be equipped with sensors to sense the position and orientation of the seat, including seat rotation and recline state, and transmit the data to computing device 115. For example, computing device 115 can receive data from sensors regarding seat rotation and recline state. Computing device 115 can determine based on sensor information from vehicle 202 seats that an occupied rear-facing infant car seat is positioned in the interior 218 of vehicle 202, for example.

Occupant type, location and orientation data can be confirmed using IR and video camera sensors to acquire IR and video data transmitted to computing device 115. The IR and video data can be processed using known machine vision techniques to identify occupants, pets, packages and objects to compare with type location and orientation data received from seat sensors. In addition, IR and video data can be used to identify occupants that may not be currently interacting with vehicle 202 controls/human interface, including dashboard controls, voice control, smart phone or tablet interfaces, etc. Occupants that may not be interacting with vehicle 202 include infants and sleeping adults, for example.

At step 1504, computing device 115 determines the direction and intensity of solar radiation (sunlight) impinging on interior 218 of vehicle 202 through greenhouse 220 via a sensor that can detect radiant energy in all directions around vehicle 202 as discussed above in relation to FIGS. 11, 12, 13 and 14. Computing device 115 can combine this information with information regarding the location and orientation of vehicle 202 from other sensors including GPS, and other information regarding the current location and direction of sunlight given the current time, latitude and longitude, to determine the direction and intensity of solar radiation impinging on vehicle 202 interior 218 through greenhouse 220. Computing device can also receive temperature data from temperature sensors located in vehicle 202 interior 218. Thermal loading from solar radiation impinging on vehicle 202 interior 218 can be determined by computing device 115 by detecting a rise in temperature, for example.

At step 1506, computing device 115 can tint one or more areas of greenhouse 220 using active glazing technology discussed in relation to FIGS. 2-10, based on determined occupant type, location, and orientation and solar radiation direction and intensity as discussed in relation to FIGS. 11-14. Computing device 115 can also determine if the vehicle 202 is in motion. If the vehicle 202 is not in motion, computing device can tint any or all active glazing areas of greenhouse to any degree of tint as discussed in relation to FIG. 10, to reduce thermal loading. Computing device 115 can detect occupants attempting to enter vehicle and make the active glazing transparent to permit entering occupants to see vehicle 202 interior 218 before entering, for example.

If the vehicle is in motion, computing device can determine if vehicle 202 is autonomous or occupant-piloted. If vehicle 202 is occupant piloted, computing device can direct active glazing to tint greenhouse 220 surfaces that are in a shade band as described above in relation to FIGS. 4, 5 and 6 and according to the direction and intensity of solar radiation, taking into account thermal loading and glare for each occupant or package or object detected by computing device 115 in the interior 218 of vehicle 202. In autonomous mode, computing device 115 can direct active glazing to tint areas of greenhouse 220 in patterns at percent transmissions, including opaque, to optimally control solar glare and thermal loading from solar radiation.

Computing device 115 can monitor a predicted path and the external environment while vehicle 202 is in autonomous mode and direct active glazing to become transparent upon detection of an event. An example of an event includes predicting that vehicle 202 will change speed or direction suddenly enough to cause motion sickness in occupants if greenhouse 220 is opaque. Sudden accelerations or decelerations without corresponding visual cues can cause motion sickness in people. Permitting occupants to see outside vehicle 202 and focus on the external environment can prevent motion sickness. Another event includes coming to a stop to pick up occupants. Computing device 115 can direct active glazing to become transparent when vehicle 202 comes to a stop to permit departing occupants to view the surroundings before departing and permits entering occupants to view the interior 218 of vehicle 202 before entering. Another event includes encountering an emergency vehicle. Computing device 115 can determine that an emergency vehicle is nearby using sensors and V-to-I interface 111 and direct active glazing to become transparent to permit occupants to monitor the emergency vehicles and pilot vehicle 202 if necessary.

In summary, in process 1500 computing device 115 determines occupant type, location and orientation, determines an intensity and direction for solar radiation (sunlight) and tints one or more portions of vehicle 202 greenhouse 220 based on the occupant type, location and orientation and the intensity and direction of solar radiation.

Figure 16:
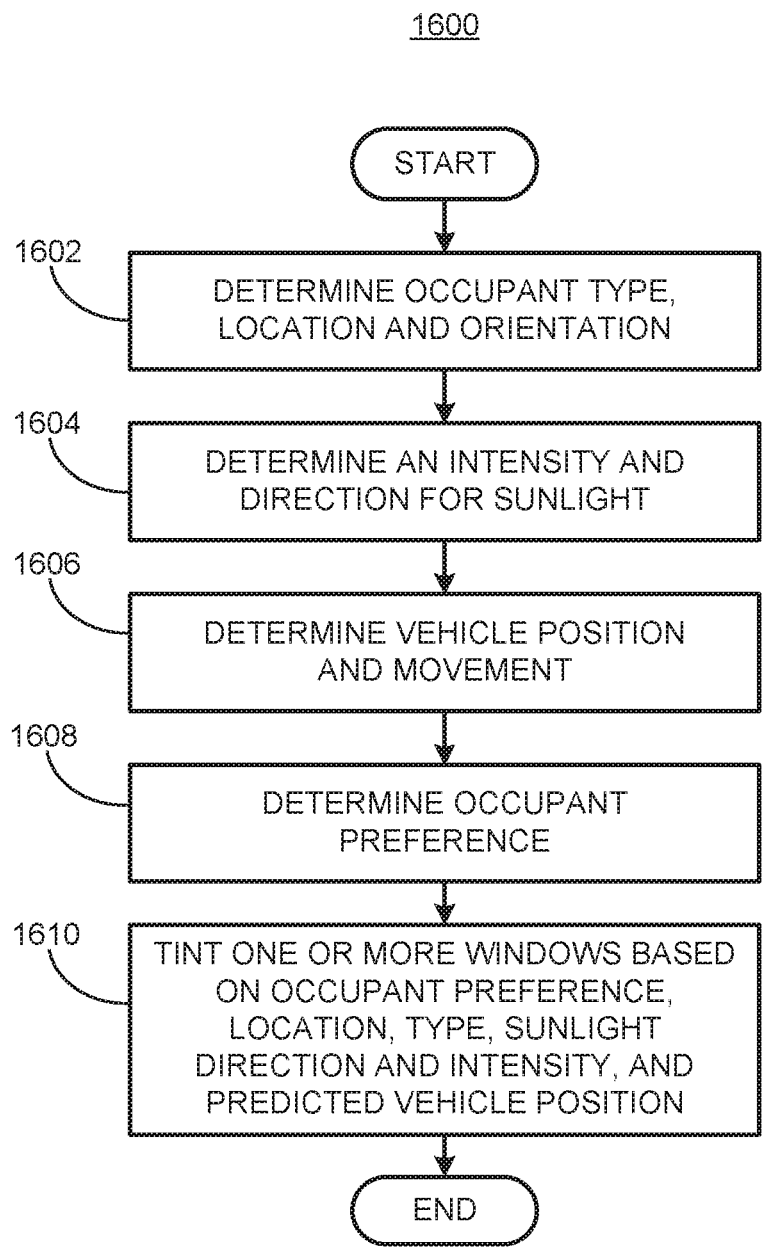
FIG. 16 flowchart diagram of an example process to tint windows.

FIG. 16 is a diagram of a flowchart, described in relation to FIGS. 1-14, of a process 1600 for tinting one or more portions of active glazing areas applied to glazed surfaces of a vehicle 202 greenhouse 220 under control of a computing device 115. Process 1600 can be implemented by a processor of computing device 115, taking as input information from sensors 116, and executing instructions and sending control signals via controllers 112, 113, 114, for example. Process 1600 includes multiple steps taken in the disclosed order. Process 1600 also includes implementations including fewer steps or can include the steps taken in different orders.

Process 1600 begins at step 1602 in which computing device 115 in vehicle 202 determines occupant type, location and orientation as discussed above in relation to FIG. 15. Occupant type can include adult, child, infant, sleeping, package, or object and each type can require protection from solar radiation and glare while vehicle 202 is in motion or parked. At step 1604, computing device 115 determines an intensity and direction for solar radiation (sunlight) and glare as discussed above in relation to FIG. 15 and at step 1606, computing device determines vehicle 202 position and movement using sensors including GPS and accelerometers.

At step 1608 computing device 115 determines occupant preferences regarding the tint of active glazing applied to vehicle 202 greenhouse 220. For example, occupant can use dashboard controls, voice interface, smart phone app, gesture acquisition interface or other human/machine interface technology to input active glazing preferences to computing device 115. Active glazing preferences can include selecting the percent transmission tint, as illustrated in FIG. 10, for greenhouse 220 windows. Computing device 115 can input occupant preferences and direct active glazing to darken or lighten in patterns that anticipate the direction solar radiation will next come from based on a predicted path for vehicle 202. In this fashion computing device can anticipate solar glare and thermal loading and prevent them. Computing device 115 can also take in account multiple occupant preferences regarding active glazing tint as shown in FIG. 14, where occupants of a shuttle bus each can control the active gazing on portions of window adjacent to their seats. Computing device 115 can also determine cases where a vehicle 202 is in autonomous mode with no occupants and is being used for package delivery. In this case vehicle 202 can have all greenhouse surfaces darkened to reduce thermal loading if necessary.

At step 1610 computing device 115 can tint active glazing of vehicle 202 greenhouse 220 based on occupant type, location and orientation, and intensity and direction for solar radiation (sunlight) taking into account occupant preferences and predicted motion of vehicle 202.

In summary, in process 1600 computing device 115 tints one or more regions of active glazing of greenhouse 220 based on type, location and orientation of occupants, intensity and direction of sunlight, taking into account user preferences and predicted movement of vehicle 202.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining an occupant type, location and orientation with respect to sunlight;
   determining an intensity and a direction of sunlight wherein the intensity and the direction of sunlight is determined by a plurality of sensors arrayed to acquire a panoramic view of the interior of a vehicle; and
   changing the tint of one or more portions of vehicle windows based on the occupant type, location and orientation and the intensity and direction of sunlight based on the intensity and the direction of sunlight is determined by the plurality of sensors arrayed to acquire the panoramic view of the interior of the vehicle.

2. The method of claim 1, wherein the occupant type includes adult, child and infant.

3. The method of claim 1, wherein the location includes a location of a vehicle seat.

4. The method of claim 3, wherein the location of the vehicle seat includes front, back and third row.

5. The method of claim 1, wherein the orientation includes reclined and reversed.

6. The method of claim 1, wherein the intensity of sunlight includes solar irradiance in watts/cm$^2$.

7. The method of claim 1, wherein the direction of sunlight includes diffuse.

8. The method of claim 1, wherein changing the tint of one or more portions of vehicle windows includes changing the tint of one or more portions of a single window.

9. The method of claim 1, wherein changing the tint of one or more portions of vehicle windows is based on occupant types, locations and orientations of two or more occupants.

10. The method of claim 9, wherein one of the two or more occupants is operating the vehicle.

11. A computer apparatus, programmed to:
    determine an occupant type, location and orientation;
    determine intensity and direction of sunlight wherein the intensity and the direction of sunlight is determined by a plurality of sensors arrayed to acquire a panoramic view of the interior of a vehicle; and
    change the tint of one or more portions of vehicle windows based on the occupant type, location and orientation and the intensity and direction of sunlight based on the intensity and the direction of sunlight is determined by the plurality of sensors arrayed to acquire the panoramic view of the interior of the vehicle.

12. The computer of claim 11, wherein the occupant type includes adult, child and infant.

13. The computer of claim 11, wherein the location includes a location of a vehicle seat.

14. The computer of claim 13, wherein the location of the vehicle seat includes left, right, middle, front, back and third row.

15. The computer of claim 11, wherein the orientation includes reclined and reversed.

16. The computer of claim 11, wherein the intensity of sunlight includes solar irradiance in watts/cm$^2$.

17. The computer of claim 11, wherein the direction of sunlight includes diffuse.

18. The computer of claim 11, wherein changing the tint of one or more portions of vehicle windows includes changing the tint of one or more portions of a single window.

19. The computer of claim 11, wherein changing the tint of one or more portions of vehicle windows is based on occupant types, locations and orientations of two or more occupants.

20. The computer of claim 19, wherein one of the two or more occupants is operating the vehicle.

* * * * *